United States Patent [19]

Takeuchi et al.

[11] Patent Number: 5,558,680

[45] Date of Patent: Sep. 24, 1996

[54] PREPARATION OF SILVER VANADIUM OXIDE CATHODES UTILIZING SOL-GEL TECHNOLOGY

[75] Inventors: Esther S. Takeuchi, East Amherst; William C. Thiebolt, III, Tonawanda, both of N.Y.

[73] Assignee: Wilson Greatbatch Ltd., Clarence, N.Y.

[21] Appl. No.: 271,154

[22] Filed: Jul. 6, 1994

Related U.S. Application Data

[63] Continuation of Ser. No. 980,330, Nov. 23, 1992, abandoned.

[51] Int. Cl.⁶ ........................................... H01M 6/00
[52] U.S. Cl. ........................... 29/623.1; 29/623.5
[58] Field of Search ......................... 29/623.5, 623.1; 429/593

[56] References Cited

U.S. PATENT DOCUMENTS 4,310,609  1/1982  Liang et al. ........................... 429/194
4,830,940  5/1989  Keister et al. ........................... 429/194

OTHER PUBLICATIONS

J. Livage, "Vanadium Pentoxide Gels", Chem, Mater, vol. 3, No. 4, 1991, pp. 578–593.

Andrukaitis, et al., "Lithium Insertion Into Oriented Microcrystals and gels of Anhydrous and Hydrated Vanadium Pentoxide," Journal of Power Sources, vol. 26, 1989, pp. 475–482.

Znaidi, et al., "Synthesis of Vanadium Bronzes $MxV_2O_5$ Through Sol–gel Processes", Mat. Res. Bull., vol. 24, 1989, pp. 1501–1514.

*Primary Examiner*—Samuel Barts
*Attorney, Agent, or Firm*—Hodgson, Russ, Andrews, Woods & Goodyear, LLP

[57] ABSTRACT

A method for preparing a cathode, having as active material silver vanadium oxide with vanadium of mixed valance properties prepared using a sol-gel process, which may generate a preparation of silver vanadium oxide and which may provide an alternate preparation technique for improving chemical control in the formation of a cathode for incorporation into an electrochemical cell.

21 Claims, 1 Drawing Sheet

PREPARATION OF SILVER VANADIUM OXIDE CATHODES UTILIZING SOL-GEL TECHNOLOGY

CROSS REFERENCE TO A RELATED APPLICATION

This is a continuation of U.S. patent application Ser. No. 07/980,330, filed Nov. 23, 1992, abandoned.

BACKGROUND OF THE INVENTION

1. Field of the Invention

This invention relates to the manufacture of a lithium electrochemical cell or battery, and more particularly to a new and improved method of preparing silver vanadium oxide composite cathode material for high energy density batteries.

2. Prior Art

A solid cathode, liquid organic electrolyte lithium anode cell or battery has been used as the power source for implantable medical devices. The cathode of such a cell, or other alkali metal anode battery or cell, may have as active material carbon fluoride, a metal oxide, a metal oxide bronze such as silver vanadium oxide, or other suitable material as disclosed in U.S. Pat. No. 4,830,940 to Keister et al., which patent is assigned to the assignee of the present invention and which patent is incorporated herein by reference.

Typically, cathode material containing silver vanadium oxide, for use in a lithium cell or battery, may be prepared in two steps by thermally decomposing a vanadium salt to produce vanadium pentoxide. A decomposable metal salt, preferably containing silver, is added to the vanadium pentoxide and the mixture is oven-dried. Following drying, the mixture is mixed and ground to ensure homogeneity and is subsequently baked for a final heating/decomposition period. Depending on the starting materials used, this heating/decomposition period can result in the release of toxic by-product gases. For example, if silver nitrate is used as the silver source, nitrous oxide type gases may be formed. Upon cooling the baked material, it is blended with appropriate amounts of graphite powder to enhance conductivity, and binder material, and then pressed to form the cathode. Such a method is described in more detail in U.S. Pat. No. 4,310,609 to Liang et al., which patent is assigned to the assignee of the present invention and which patent is incorporated herein by reference.

Vanadium pentoxide ($V_2O_5$) gels, produced by the "sol-gel process", have been known in the art of material sciences (see for Example, J. Livage, Chem. Mater 3:578–593, 1991). Sol-gel synthesis of transition metal oxides may be accomplished by introducing a material into solution and under specific conditions, such as pH, elevated temperatures, or solvent levels, a gel is formed from the species of interest. Typically the synthesis of $V_2O_5$ gels may involve protonation accomplished by adding an acid to a vanadium salt solution or by passing the solution through an ion-exchange resin. Preparation of $V_2O_5$ gels by the sol-gel process may result in reduction of vanadium resulting in mixed-valence properties of the gels; and differences in structural orientation or character of the composition resulting in a change in physical and/or electrochemical properties. Thus, utilization of the sol-gel method, as an alternate preparation technique to other chemical processes currently used for cathode formation, allows generation of novel properties of the material and provides different ways of preparing cathodes.

References relating to the art of the sol-gel process, and disclosing $V_2O_5$ gels, include the following:

J. Livage et al. "Chem. Mater." 3:578–593, 1991, reviews synthesis of $V_2O_5$ gels by the sol-gel process, structure studies of the resultant gels, electronic and ionic properties of vanadium oxide thin films deposited from gels, and intercalation of metal or molecular species into $V_2O_5$ gels.

E. Andrukaitis et al "J. Power Sources", 26:475–482, 1989, describe lithium insertion into electrodes composed of $V_2O_5$ deposits formed by either electrophoretic deposition of ammonium hexavanadate monohydrate, or by spreading hydrated $V_2O_5$ gels followed by heating at elevated temperatures.

L. Znaidi et al. "Mat. Res. Bull.", 24:1501–1514, 1989, describe the preparation of vanadium bronzes using the sol-gel process with the intercalation of sodium or silver ions, and structural studies of the resultant vanadium bronzes.

SUMMARY OF THE INVENTION

The present invention relates to a new and improved method of preparing silver vanadium oxide composite cathode material for high energy density batteries. The present invention comprises a method by which a cathode is formed from materials that include silver vanadium oxide prepared by the sol-gel process, and may include an electronic conductor, and binder materials. The silver vanadium oxide material may be prepared by the intercalation of silver ions into starting materials comprising one or more vanadium containing compounds through intimate contact of a silver-containing component with the vanadium-containing compound, followed by thermal treatment wherein a mixed metal oxide containing both oxidation states of vanadium is formed. Such vanadium-containing compounds include, but are not limited to, polyvanadic acid and vanadium oxide. Cathode plates can be formed by an entirely dry pressing procedure thereby enhancing the shelf life of the resulting plates. Alternatively, the procedure can include dropwise addition of liquid electrolyte to the cathode mixture prior to pressing to enhance the performance and rate capability of an assembled cell incorporating the cathode. Yet another process of forming the cathode includes spraying the resultant material onto a substrate to form a thin sheet coating of active cathode material.

It is an object of this invention to provide a new and improved method for preparing a silver vanadium oxide composite cathode for use in high energy density batteries.

It is a further object of this invention to provide improved chemical control for the formation of a mixed metal oxide cathode material.

It is still another object of this invention to provide a method for producing thin film cathodes comprising a preparation of silver vanadium oxide, wherein these cathodes would require no conductive additive and no binder.

BRIEF DESCRIPTION OF THE DRAWINGS

The above and other objects, features, and advantages of the present invention will be apparent in the following detailed description of the preferred embodiments taken in conjunction with the accompanying drawings, in which.

DETAILED DESCRIPTION OF THE INVENTION

Figure 1:
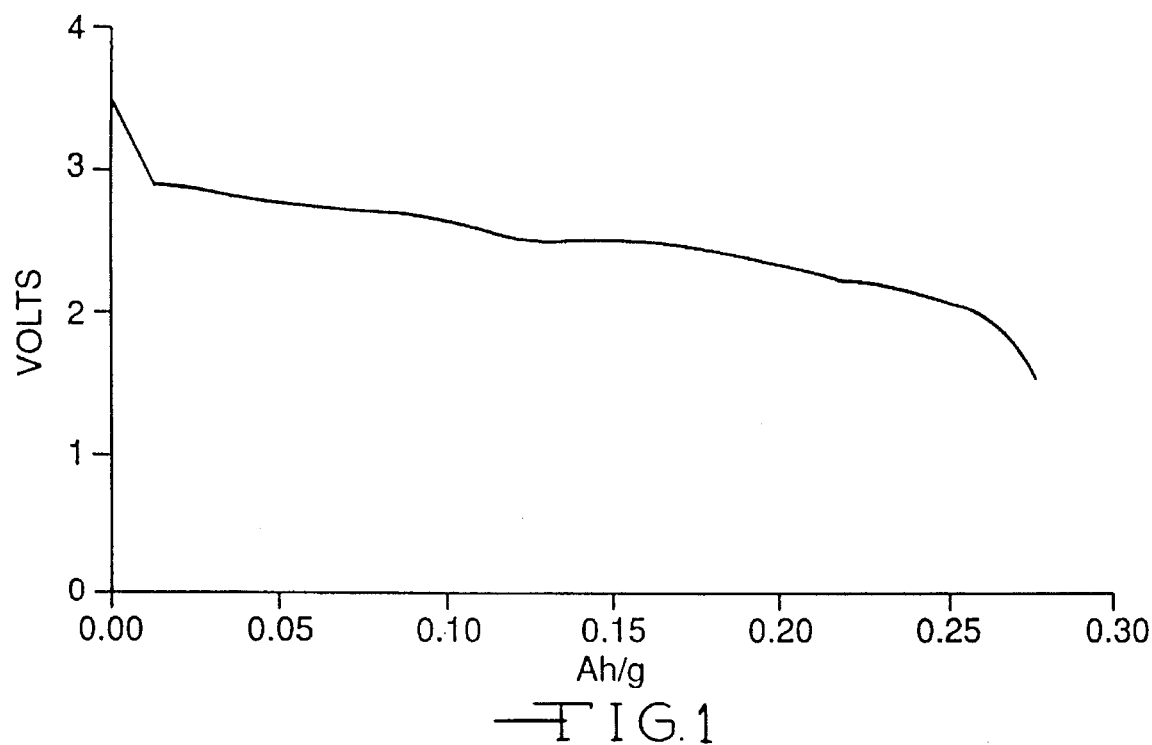
FIG. 1 is a graph showing the discharge curve of a newly assembled cell containing a cathode produced in accordance with the method of the present invention wherein the silver vanadium oxide was synthesized utilizing $AgNO_3$ and sol-gel technology.

The method of the present invention comprises preparing vanadium oxide utilizing sol-gel technology, intercalating silver cations into the acidified vanadium oxide gel, thermally treating and dehydrating the silver vanadium oxide mixture, combining the mixture with an electronic conductor and binder materials, and pressing the composite materials to form a cathode plate. Alternately, a thin coating of the resultant active cathode material may be applied, such as via a spray coating technique, to an appropriate substrate material in the formation of a cathode. Formation of vanadium pentoxide ($V_2O_5$) gels by the sol-gel process involves protonation of vanadium species wherein the protonation may be performed, for example, by adding an acid to aqueous solutions of vanadate salts or by acidification of a vanadium salt solution via passage of the solution through a proton exchange resin. $V_2O_5$ gels possess mixed valence properties as a result of some reduction (typically in the range from about 1% to 10%) of vanadium occurring during the synthesis of the gels, and also by subsequent dehydration of the synthesized gel. Formation of the vanadium pentoxide gel can also be accomplished by heating a dispersed aqueous suspension of $V_2O_5$.

Intercalation of silver cations into the layered structure of $V_2O_5$ gels may be accomplished by intimate contact of a silver-containing component with $V_2O_5$ gels followed by thermal treatment wherein a mixed metal oxide is formed. The intercalation of silver cations involves proton-exchange reactions with acidic protons contained within the $V_2O_5$ gels. Thermal treatment of the silver vanadium oxide mixture serves in part to remove water from the mixture. During the dehydration process, OH— bond breaking occurs which, along with the intercalated cation, plays an important role in the evolution of the structural orientation of the resultant crystalline compound. Thus, the electrical charge and properties of the silver vanadium oxide, produced by utilizing sol-gel technology, is influenced by parameters which include the following: the amount of reduced vanadium ions (state of reduction); the extent of intercalation of silver cations (exchange cation content); and the water content remaining after dehydration (the hydration state). Controlled alteration of one or more of these parameters may lead to the formation of mixed metal oxide compositions, comprising silver vanadium oxides, with differences in structural orientation or anisotropic character which can give rise to variations in properties such as electrical conductivity.

A cathode, containing cathode active material prepared by the method of the present invention, can be used in a nonaqueous lithium electrochemical cell as described by U.S. Pat. No. 4,830,940 to Keister et al., wherein the electrochemical cell also contains an alkali metal anode, preferably lithium, or alloys thereof; a nonaqueous electrolyte which preferably is comprised of a combination of lithium salt and an organic solvent; and a separator material electrically insulating the anode from the cathode with sufficient porosity to allow for electrolyte flow. The method of preparation of silver vanadium oxide composite material for use as cathode active material in a cathode, and an electrochemical cell incorporating the cathode according to the present invention, are illustrated further by the following examples.

EXAMPLE I

A cathode was formed from materials including silver vanadium oxide prepared by the sol-gel process in the following manner. Polyvanadic acid was prepared by passing 50 ml of a 0.1 M solution of $NaVO_3$ through an activated sample of DOWEX 50×2—100 ion exchange resin. The polyvanadic acid was mixed with 0.29 g $Ag_2O$ and the resulting slurry was baked at 240° C. for 5 hours to remove water and than at 400° C. for 8 hours to form silver vanadium oxide. The silver vanadium oxide thus formed was mixed with binder and conductor materials comprising carbon and polytetrafluoroethylene (PTFE) to form a depolarizer which was pressed into cathodes for use in electrochemical cells. A cathode comprising 3% carbon, 3% polytetrafluoroethylene (PTFE), and 94% silver vanadium oxide was prepared using the method of the present invention. A battery cell was assembled using the foregoing cathode, lithium as the anode, 1M$LiAsF_6$ in propylene carbonate and dimethoxyethane as the electrolyte, and a porous polymer sheet as a separator. The resulting cell delivered 0.261 Ah/g to a 2 V cut-off.

EXAMPLE II

Polyvanadic acid was prepared by passing 50 ml of a 0.1 M solution of $NaVO_3$ through an activates ample of DOWEX 50×2—100 ion exchange resin. The polyvanadic acid was mixed with 1.33 g $Ag_2O$ and the resulting slurry was baked at 400° C. for 8 hours to form silver vanadium oxide. The silver vanadium oxide thus formed is mixed with binder and conductor materials comprising carbon and PTFE to form a depolarizer which can be pressed into cathodes for use in electrochemical cells. A cathode comprising 3% carbon, 3% PTFE, and 94% silver vanadium oxide was prepared using the method of the present invention. A battery cell was assembled using the foregoing cathode, lithium as an anode, 1M $LiAsF_6$ in propylene carbonate and dimethoxyethane as the electrolyte, and a polymer sheet as a separator. The resulting cell delivered 0.240 Ah/g to a 2 V cut-off.

EXAMPLE III

Polyvanadic acid was prepared by passing 25 ml of a 0.9 M solution of $NaVO_3$ through an activated sample of DOWEX 50×2—100 ion exchange resin. The polyvanadic acid was mixed with 1.91 g $AgNO_3$ and the resulting slurry was baked at 450° C. for 24 hours to form silver vanadium oxide. The silver vanadium oxide thus formed was mixed with binder and conductor materials comprising carbon and PTFE to form a depolarizer which can be pressed into cathodes for use in electrochemical cells. A cathode comprised of 3% carbon, 3% PTFE, and 94% silver vanadium oxide was prepared using the method of the present invention. A battery cell was assembled using the foregoing cathode, lithium as the anode, 1 M $LiAsF_6$ in propylene carbonate and dimethoxyethane as the electrolyte, and a polymer sheet as a separator. The resulting cell delivered 0.258 Ah/g to a 2 V cut-off. The discharge curve of the resulting cell containing a cathode produced in accordance with the method of the present invention is depicted in FIG. 1.

EXAMPLE IV

Figure 2:
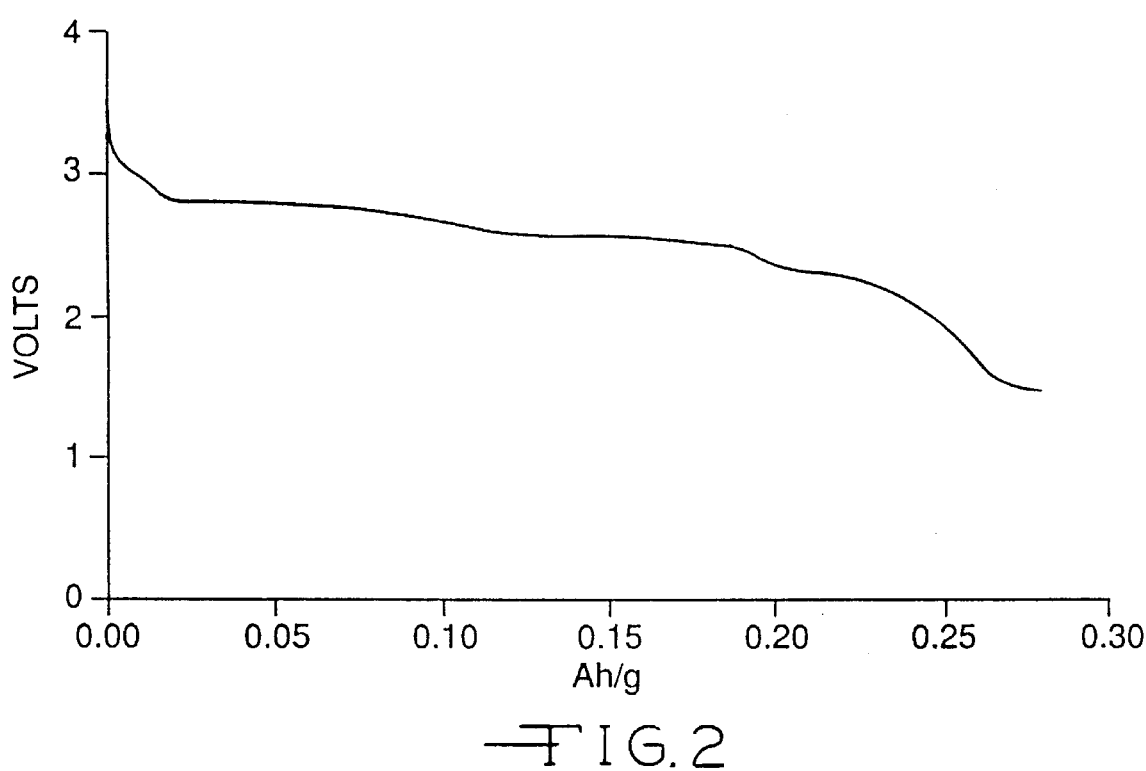
FIG. 2 is a graph showing the discharge curve of a newly assembled cell containing a cathode comprising silver vanadium oxide produced in accordance with the method of the present invention wherein the silver vanadium oxide was synthesized utilizing $Ag_2O$ and sol-gel technology.

Silver vanadium oxide is prepared from an alkali metal hydroxide, a silver compound, and vanadium pentoxide. The alkali metal may be selected from the group consisting of lithium, potassium, or sodium. The silver compound can be either $Ag_2O$ or $AgNO_3$ as illustrated in the preceding examples. The materials are mixed such that the ratio of metals sodium or lithium:silver:vanadium is 0.05:0.95:2.0. The mixed materials are combined with water so that the solids and/or dissolved solids range from about 20% to about 30% of the slurry per solution weight. The resulting mixture is stirred at from about 60° C. to about 90° C. for about 3 hours or sufficient time to allow a gel to form. The gel is mixed further and then is dehydrated by baking at 375° C. for 16 to 24 hours forming silver vanadium oxide. The silver vanadium oxide thus formed is combined with conductive additives and binder, such as carbon and PTFE, to form a depolarizer which can be pressed to form a cathode for use in an electrochemical cell. A resultant discharge curve for a cell containing cathode active material prepared from LiOH, $Ag_2O$, and $V_2O_5$ is shown in FIG. 2.

EXAMPLE V

A silver vanadium oxide gel is prepared according to the method of the present invention as illustrated in Example I. The resulting gel is made less viscous by the addition of water until the consistency is amenable to aspiration through an air spray gun. The gel of reduced viscosity may then be sprayed, using a spray coating technique, onto a metal foil substrate which is held at temperatures ranging from 140°0 C. to 375° C. The desirable range of a coating thickness is from about 0.001 to about 0.008 inches, depending on the application of the particular electrochemical cell. The coated substrate is baked at 375° C. to form silver vanadium oxide. The silver vanadium oxide coated-substrate may then be cut to the desired size and used directly as a cathode in assembling a battery cell.

EXAMPLE VI

A silver vanadium oxide gel is prepared according to the method of the present invention as illustrated in Example II. The resulting gel is made less viscous by the addition of water until the consistency is amenable to aspiration through the air spray gun. The gel of reduced viscosity may then be sprayed, using a spray coating technique, onto a metal foil substrate which is held at temperatures ranging from 140° C. to 375° C. The desirable range of a coating thickness is from about 0.001 to about 0.008 inches, depending on the application of the particular electrochemical cell. The coated substrate is baked at 375° C. to form silver vanadium oxide. The silver vanadium oxide coated-substrate may then be cut to the desired size and used directly as a cathode in assembling a battery cell.

EXAMPLE VII

A silver vanadium oxide gel is prepared according to the method of the present invention as illustrated in Example III. The resulting gel is made less viscous by the addition of water until the consistency is amenable to aspiration through an air spray gun. The gel of reduced viscosity may then be sprayed, using a spray coating technique, onto a metal foil substrate which is held at temperatures ranging from 140° C. to 375° C. The desirable range of a coating thickness is from about 0.001 to about 0.008 inches, depending on the application of the particular electrochemical cell. The coated substrate is baked at 375° C. to form silver vanadium oxide. The silver vanadium oxide coated-substrate may then be cut to the desired size and used directly as a cathode in assembling a battery cell.

EXAMPLE VIII

A silver vanadium oxide gel is prepared according to the method of the present invention as illustrated in Example IV. The resulting gel is made less viscous by the addition of water until the consistency is amenable to aspiration through an air spray gun. The gel of reduced viscosity may then be sprayed, using a spray coating technique, onto a metal foil substrate which is held at temperatures ranging from 140° C. to 375° C. The desirable range of a coating thickness is from about 0.001 to about 0.008 inches, depending on the application of the particular electrochemical cell. The coated substrate is baked at 375° C. to form silver vanadium oxide. The silver vanadium oxide coated-substrate may then be cut to the desired size and used directly as a cathode in assembling a battery cell.

The above detailed description and examples are intended for the purposes of illustrating the invention and are not to be construed as limiting. For example, depending on the application of the electrochemical cell, the range of cathode compositions used can vary from 100% silver vanadium oxide to 80% silver vanadium oxide with 10% each carbon and PTFE or other suitable binding and conductor materials known in the art.

The invention can be embodied otherwise without departing from the principles thereof, and such other embodiments are meant to come within the scope of the present invention as defined by the appended claims.

What is claimed is:

1. A method of preparing a cathode of an electrochemical cell, the cathode containing as active material silver vanadium oxide prepared in a sol-gel solution, the method comprising:

a) mixing at least one silver-containing component with at least one vanadium-containing compound in a gel solution to thereby intimately contact them, in that manner providing silver vanadium oxide in the gel solution;

b) dehydrating the gel solution by heating to provide an anhydrous silver vanadium oxide; and c) providing the cathode by forming the anhydrous silver vanadium oxide into a desired shape for the cathode.

2. The method of claim 1 wherein the silver-containing component is selected from the group consisting of silver oxide, silver nitrate, silver metal, silver carbonate, and a combination thereof.

3. The method of claim 1 wherein the vanadium-containing compound is selected from the group consisting of a vanadium oxide salt, polyvanadic acid, vanadium pentoxide, and a combination thereof.

4. The method of claim 1 wherein the vanadium-containing compound is vanadium pentoxide; and step a) further comprises, in providing the gel solution comprising the silver vanadium oxide, the addition of an alkali metal hydroxide containing an alkali metal selected from the group consisting of lithium, sodium, and potassium.

5. The method of claim 4 wherein the ratio of alkali metal:silver:vanadium in the mixed metal oxide is 0.0–0.10:0.90–1.0:2.0.

6. The method of claim 1 wherein dehydrating the gel solution comprising the silver vanadium oxide includes heating the gel solution for a time ranging from between about 3 hours to about 5 hours at a temperature ranging from between about 140° C. to about 340° C.; followed by baking the dehydrated silver vanadium oxide for a time ranging from between about 8 hours to about 24 hours at a temperature ranging from between about 350° C. to about 450° C.

7. The method of claim 1 wherein the dehydrating step comprises baking the gel solution comprising the silver vanadium oxide for a time ranging from between about 8 hours to about 24 hours at a temperature ranging from about 350° C. to about 450° C.

8. The method of claim 1 wherein the cathode comprises from between about 80 weight percent to about 99 weight percent of silver vanadium oxide.

9. The method of claim 1 wherein the step of forming the cathode further comprises the addition of binder and conductor materials.

10. The method of claim 9 wherein the cathode is comprised of about 3 weight percent carbon, about weight percent of a fluoro-resin powder, and about 94 weight percent silver vanadium oxide.

11. The method of claim 1 wherein forming the cathode from the anhydrous silver vanadium oxide further comprises the dropwise addition of a liquid electrolyte.

12. A method of preparing a cathode for an electrochemical cell, the cathode containing as active material silver vanadium oxide prepared in a sol-gel solution, the method comprising:

a) mixing at least one silver-containing component with at least one vanadium-containing compound in a gel solution to thereby intimately contact them, in that manner providing silver vanadium oxide in the gel solution;

b) providing a substrate heated to a temperature sufficient to evaporate the gel solution contacted with the substrate;

c) spraying the silver vanadium oxide gel solution onto the heated substrate, the heated substrate serving to directly dehydrate the sprayed gel solution to form an anhydrous coating of silver vanadium oxide on the substrate; and d) utilizing the anhydrous silver vanadium oxide as the cathode active material comprising the cathode of the electrochemical cell.

13. The method of claim 12 wherein the silver-containing component is selected from the group consisting of silver oxide, silver nitrate, silver metal, silver carbonate, and a combination thereof.

14. The method of claim 12 wherein the vanadium-containing compound is selected from the group consisting of a vanadium oxide salt, polyvanadic acid, vanadium pentoxide, and a combination thereof.

15. The method of claim 14 wherein the vanadium salt contains an alkali metal selected from the group consisting of lithium, sodium, and potassium.

16. The method of claim 12 wherein the vanadium-containing compound is vanadium pentoxide; and step a) further comprises, in providing the gel solution comprising the silver vanadium oxide, the addition of an alkali metal hydroxide containing an alkali metal selected from the group consisting of lithium, sodium, and potassium.

17. The method of claim 16 wherein the ratio of alkali metal:silver:vanadium in the mixed metal oxide is 0.0–0.10:0.90–1.0:2.0.

18. The method of claim 12 wherein the gel solution comprising the silver vanadium oxide is first diluted by addition of a suitable liquid prior to spraying onto the heated substrate to form the anhydrous coating of silver vanadium oxide on the substrate.

19. The method of claim 12 including providing the coating of silver vanadium oxide on the substrate having a thickness in the range of from between about 0.001 inches to about 0.008 inches.

20. The method of claim 12 wherein the cathode comprises from about 80 weight percent to about 99 weight percent of silver vanadium oxide.

21. The method of claim 12 including heating the substrate at a temperature ranging from between about 120° C. to about 400° C. while spraying the gel solution onto the substrate.

* * * * *